A. R. TRIST.
MANUFACTURE OF CUP PACKING OF COMPOSITE MATERIAL.
APPLICATION FILED MAR. 15, 1913.
1,118,315. Patented Nov. 24, 1914.
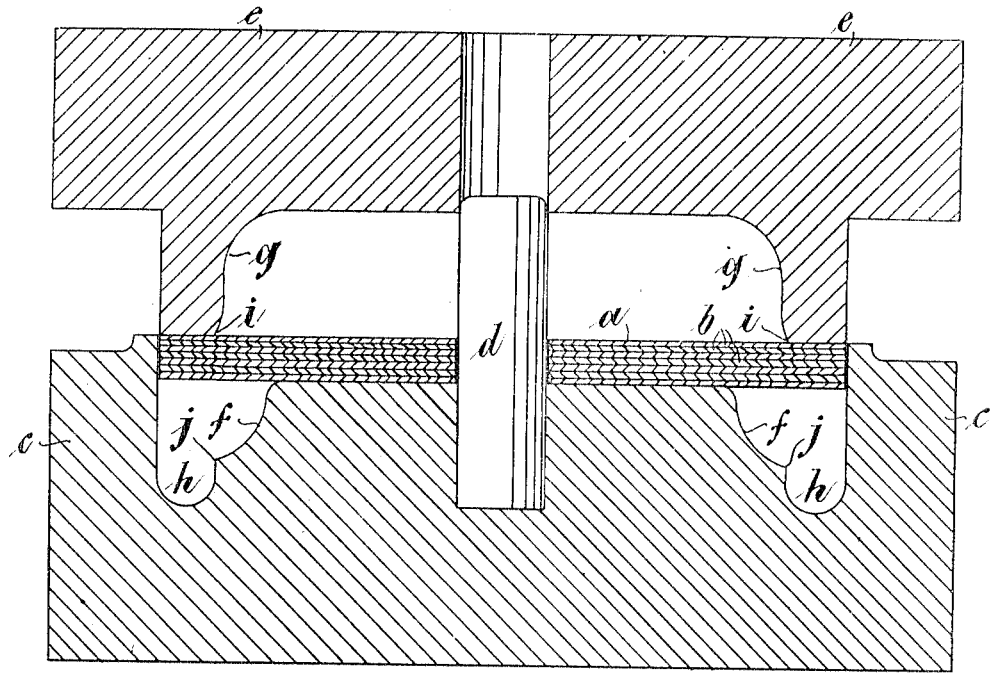
Fig: 1.
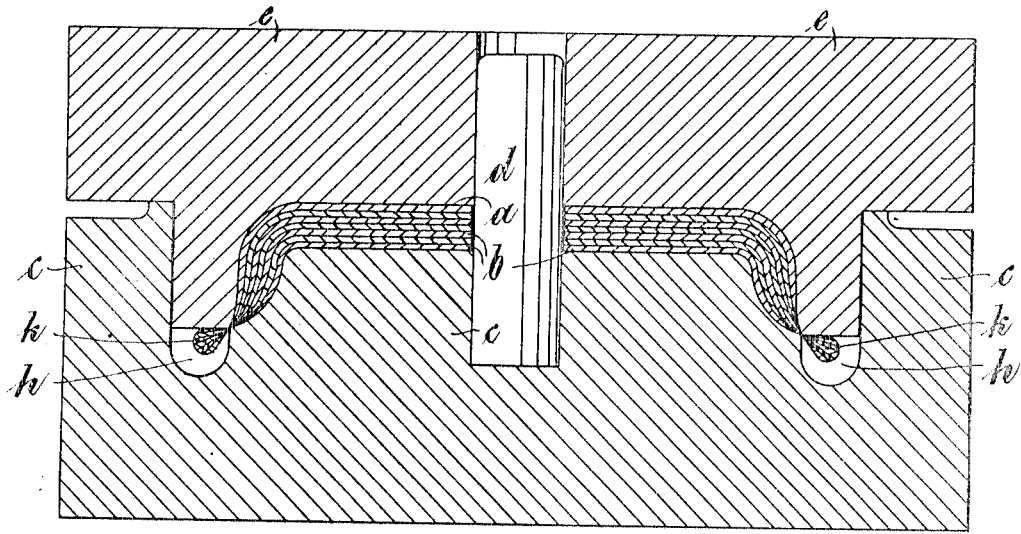
Fig: 2.
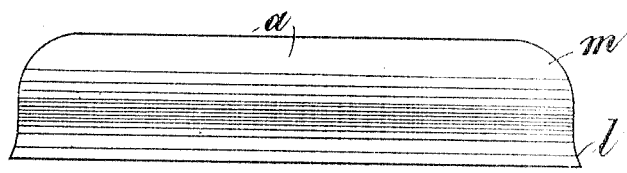
Fig: 3.
WITNESSES:
John C. Sanders
Albert F. Heuman
INVENTOR:
Arthur Ronald Trist
by M. Wallace White
ATT'Y

UNITED STATES PATENT OFFICE.

ARTHUR RONALD TRIST, OF LONDON, ENGLAND.

MANUFACTURE OF CUP-PACKING OF COMPOSITE MATERIAL.

1,118,315. Specification of Letters Patent. Patented Nov. 24, 1914.

Application filed March 15, 1913. Serial No. 754,499.

*To all whom it may concern:*

Be it known that I, ARTHUR RONALD TRIST, subject of the King of Great Britain and Ireland, residing at London, England, have invented new and useful Improvements in and Relating to the Manufacture of Cup-Packing of Composite Material, of which the following is a specification.

This invention relates to the manufacture of cup packing of composite material and has for its object the manufacture of such cup packings so as to obtain a product which will have great durability and obviate the disadvantage which obtains with products made by known methods.

It has been found that cup packings consisting of layers of textile material and held together initially by an agglutinant such as india-rubber solution or the like, when manufactured under known methods do not possess a high capacity for durability owing to the want of uniformity in which the various layers are disposed one upon the other when turned up as a flange to form the walls of the cup resulting from the cockling up of the edge of the layers of textile material during the bending over of the same to form the sides of the cup and it is the special feature of this invention that these disadvantages are entirely overcome.

In order that the invention may be the better understood, I will now proceed to describe the same in relation to the accompanying drawings, reference being had to the letters and figures marked thereon.

Like letters refer to like parts in the various figures, in which:—

Figure 1 is a sectional elevation of a mold with a blank inserted therein ready for the forming operation to take place. Fig. 2 is a similar view after the molding operation has taken place. Fig. 3 is an external view of a finished cup packing.

The blank $a$ consists of a series of layers of textile material $b$ which are stuck together by india-rubber solution or the like between the various layers and left in an uncured or unvulcanized condition. The blank $a$ is placed within the lower mold $c$ about a pin $d$ and has placed upon it the upper forming die $e$, the parts $c$ and $e$ being made to slide one within the other. The part $c$ has a curved portion $f$ of the particular contour that the inside flange of the cup packing is to ultimately take while the upper part $e$ has a curved portion $g$ of a contour corresponding with the shape of the outer portion of the flange of the cup packing. Below the curved portion $f$ of the part $c$ is a recess $h$, the purpose of which is hereinafter described. When the parts $e$ and $c$ are in place as shown in Fig. 1, they are pressed together under a press of any suitable description and as the part $g$ bends the edges of the blank $a$ over the upper curved corner in the part $c$, a dragging or stretching action takes place between the part $g$ and the layers of the blank $a$, the outermost layer getting the most drag or stretch and each succeeding layer getting less and less until the bottommost or innermost layer has little or no drag at all. As the part $e$ descends the corner $i$ pinches the blank $a$ against the corner $j$ of the part $c$ and at the same time presses the layers of the textile material into close contact with one another perfectly evenly and in a stretched condition and forces out any excess of india-rubber solution or other agglutinant which may be present so as to extrude the same as shown in Fig. 2 into the recess $h$ and nip the layers of textile material at the same time. The two parts of the mold $e$ and $c$ are now kept under pressure and are submitted to a vulcanizing heat for the necessary period in order to consolidate and stiffen the structure. After the vulcanizing process has been finished the mold is opened and the extruded ring $k$ is cut off at the fine edge so as to present a cup packing of the appearance shown in Fig. 3 in which the edge $l$ is not only feathered in shape but has a flare outward. Cup packings made in accordance with this process have a very long life, wear evenly all around the rubbing surface and are very flexible, and therefore very efficient in making a tight sliding joint with the greatest facility directly pressure is applied to the back thereof. It is of course, advisable in using packings of this sort that the curved part $m$ should be supported by the parts of the piston or junk-ring as the case may be which carries this part of the cup packing.

Having thus fully described my invention, I claim as new and desire to secure by Letters Patent:—

A process for the manufacture of cup packing, consisting of forming a blank of a series of layers of textile fabric, initially stuck together by an agglutinant adapted to be hardened under heat and pressure, pressing the said blank in a contracting mold so as to stretch and drag down the layers of textile material and leave a flare at the edge, the relative stretch of the various layers decreasing from the outermost layer to the innermost layer, submitting the molded cup packing to heat while under pressure to consolidate and harden same and removing from the molded packing the extruded agglutinant and excess textile material, substantially as described.

In testimony whereof I have signed my name to this specification in the presence of two subscribing witnesses.

ARTHUR RONALD TRIST.

Witnesses:
WALTER CARVER,
O. J. WATT.